May 28, 1957     R. E. CLARKE ET AL     2,793,942
APPARATUS FOR THE MANUFACTURE OF MAGNESIUM HYDROXIDE
Filed Aug. 10, 1951
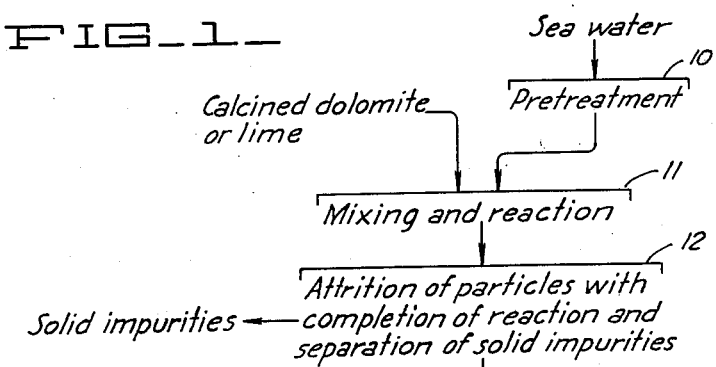
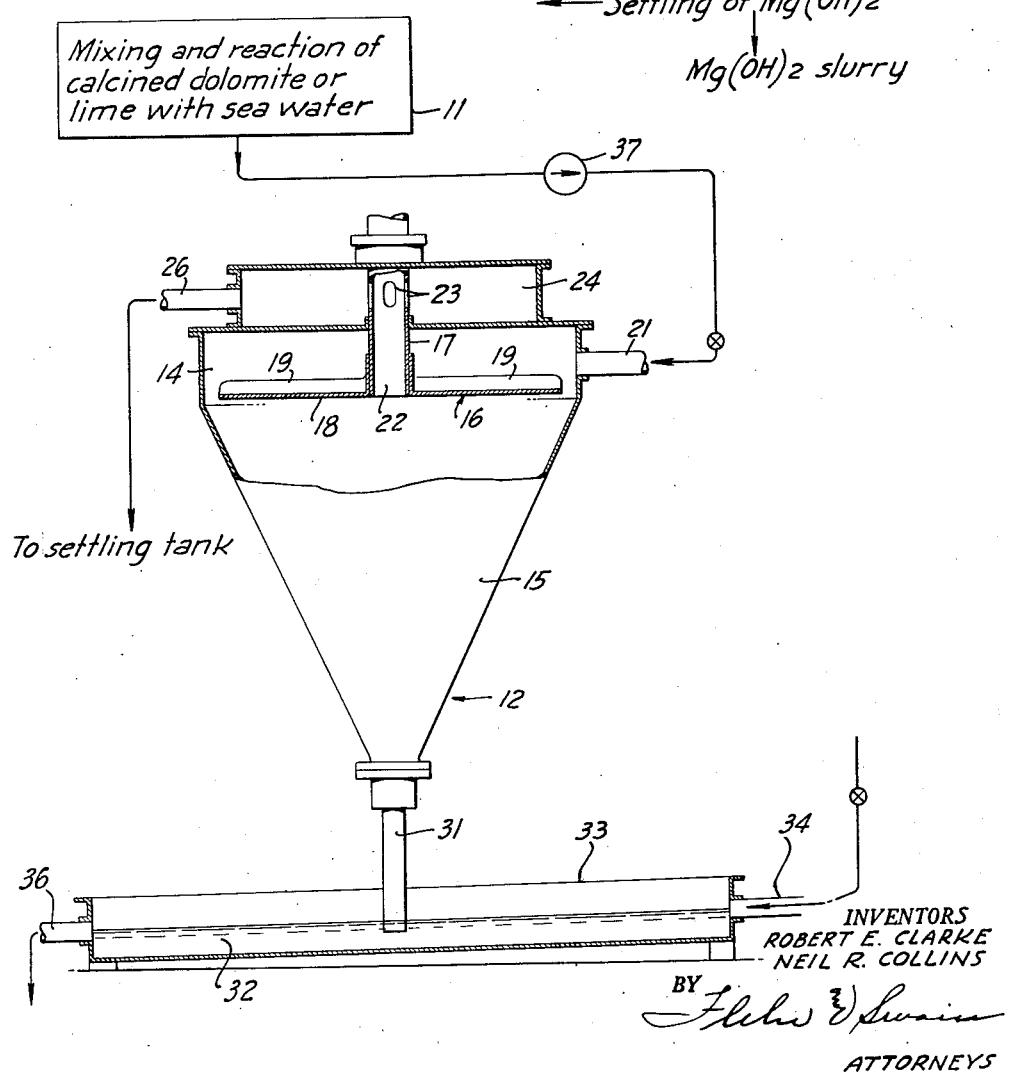
INVENTORS
ROBERT E. CLARKE
NEIL R. COLLINS
ATTORNEYS

United States Patent Office 2,793,942
Patented May 28, 1957

2,793,942
APPARATUS FOR THE MANUFACTURE OF MAGNESIUM HYDROXIDE

Robert E. Clarke, Palo Alto, and Neil R. Collins, Los Altos, Calif., assignors to Merck & Co., Inc., Rahway, N. J., a corporation of New Jersey Application August 10, 1951, Serial No. 241,282

2 Claims. (Cl. 23—285)

This invention relates generally to the manufacture of magnesium products by precipitation of magnesium hydroxide from sea water or other brines containing convertible magnesium salts. More specifically it pertains to the removal of solid phase impurities from the reaction mixture resulting from the reaction of a lime containing precipitant with a brine containing convertible magnesium salts, and to apparatus useful for carrying out such operations.

In our copending application Serial No. 222,476, filed April 23, 1951, now Patent No. 2,703,748, we have disclosed a process which greatly facilitates the large-scale manufacture of relatively pure magnesium hydroxide from sea water. A feature of the process is that after forming a reaction mixture by commingling calcined dolomite or lime with sea water, the mixture is subjected to special treatment whereby particles or fragments containing unreacted precipitant are crushed to expose unreacted lime, and simultaneously centrifugal separation is applied for the removal of solid phase impurities. The discharge from this special treatment step, which consists of mother liquor and precipitated magnesium hydroxide, is delivered to a settling tank from which magnesium hydroxide can be withdrawn in a thickened slurry for further treatment. A desirable feature of the process is that it effectively removes solid impurities originating in the dolomite or lime, thus simplifying preparation of the precipitant and minimizing the presence of such impurities in the settled magnesium hydroxide slurry. One characteristic which has been noted in the operation of this process is that there is a tendency for considerable air to be carried into the settling tank from the special treatment, and this tends to interfere with rapid settling out of the magnesium hydroxide, and with treatment operations to which the settled magnesium hydroxide slurry may be subjected, such as washing with fresh water. We have found that a large part, if not all, of this troublesome air is introduced into the material during the special treatment of the reaction mixture, and apparently becomes mechanically associated with the precipitated magnesium hydroxide.

It is the general object of the present invention to improve the process disclosed and claimed in our copending application Serial No. 222,476, filed April 23, 1951, particularly with respect to eliminating or minimizing the difficulty outlined above.

Another object of the invention is to provide an improved process of the above character in which a novel procedure is provided for removing the centrifugally separated solid phase impurities, without permitting introduction of atmospheric air.

A further object of the invention is to provide a novel apparatus suitable for use in our process.

Additional objects and features of the invention will appear from the following description in which the preferred embodiment has been set forth in detail in conjunction with the accompanying drawing.

Referring to the drawing:

Figure 1 is a flow sheet generally illustrating the process of our aforementioned copending application Serial No. 222,476.

Figure 2 is a schematic side elevational view illustrating our apparatus for carrying out special treatment of the reaction mixture.

The process illustrated in the flow sheet of Figure 1 corresponds to the process of our copending application 222,476 and consists in subjecting sea water or other suitable brine to pretreatment at 10 to produce a clarified brine suitable for the main precipitating operation. This pretreatment can be carried out substantially as set forth in Clarke 2,276,245, and as described in our previously mentioned copending application. Briefly the brine is reacted with a precipitant like calcined lime or dolomite, to precipitate calcium bicarbonate as calcium carbonate, and to precipitate a minor percentage of the convertible magnesium salts present. Settlement and filtration serve to remove solid phase material, leaving a clarified or pretreated brine. The pretreated brine is mixed and reacted with a precipitant at 11 to produce a reaction mixture for treatment at 12. The precipitant can be calcined dolomite or lime, with or without preliminary slaking. Reaction of the precipitant with the convertible magnesium salts present, namely magnesium sulphate and magnesium chloride, serves to precipitate solid phase magnesium hydroxide.

In operation 12 the reaction mixture from 11 is subjected to special treatment involving attrition of particles to expose unreacted lime, whereby the reaction with magnesium salts is rapidly completed. At the same time separating forces are applied to cause separation of solid phase impurities. Solid phase impurities, such as calcium carbonate, sand or other siliceous material originating with the precipitant employed, are centrifugally separated and removed in this operation.

The material removed from operation 12 consists of mother liquor and precipitated magnesium hydroxide, which is subjected to settlement at 13, for withdrawal of a thickened magnesium hydroxide slurry as indicated.

According to the present invention, operation 12 of Figure 1 is carried out by use of the apparatus illustrated in Figure 2. This consists of a vessel or chamber 14 which is annular in cross-sectional contour, and which has a lower conical shaped portion 15. In the upper part of the chamber there is a rotatable impeller 16, which is attached to the vertical drive shaft 17. The impeller consists of the disc 18 which serves to mount the radially extending vanes 19. One side of the vessel is provided with the inlet pipe connection 21, which delivers material into the region directly above the zone of operation of the impeller. The shaft 17 is made hollow to provide the flow passage 22, and is formed to provide ports 23 for flow of material into the chamber 24. From this chamber the material is delivered to the outlet pipe 26. Shaft 17 is connected to suitable external drive means for turning the impeller at a desired speed.

The lower end of the chamber 14 is connected to the vertical pipe 31, which serves the purpose of removing separated solid phase impurities. The lower open end of the pipe 31 terminates within a body of liquid 32, which is maintained within the vessel 33. As illustrated, this vessel can be a trough or launder connected at its ends with the inlet and discharge pipes 34 and 36. By regulating the rate of flow through the launder, a liquid level can be maintained to submerge the lower end of the pipe 31, and to carry off solids into the discharge pipe 36. The pipe 31 is preferably relatively short, as for example of the order of one to five feet in length. In other words it is short compared to a pipe which is sufficiently long to form a barometric leg.

Operation of the apparatus shown in Figure 2, and an explanation of the process carried out in conjunction with the same, are as follows: The reaction mixture from operation 11 is supplied continuously to the pipe 21, as by means of the pump 37. The impeller 16 is continuously rotated and material is continuously removed through the discharge pipe 26. The interior of the chamber 14 is largely maintained filled with liquid, although according to our observations a vortex pocket is present below the impeller 16. Due to the rotation of the impeller the material discharging from the pipe 21 into the treatment chamber is immediately acted upon by the vanes to cause relatively violent localized turbulence. Relatively soft masses, having nuclei containing unreacted precipitant, are subjected to crushing and attrition in the zone of violent turbulence, thus releasing unreacted precipitant for contact with the remaining magnesium salts of the brine, with the result that the reaction is completed within the treatment chamber before the material is discharged through the pipe 26.

Rotary velocity applied by the impeller causes material to move outwardly and downwardly about the periphery of the impeller whereby the body of material below the impeller is caused to swirl about the vertical axis of the chamber. Heavier solid phase impurities present, such as calcium carbonate, sand or other siliceous material derived from the precipitant, are caused to separate out in the lower end of the conical shaped portion 15. The mixture of mother liquor and precipitated magnesium hydroxide flows continuously through the shaft passage 22 into the chamber 24 and from thence discharges continuously through pipe 26 to the settling tank.

If the pipe 31 were open to the atmosphere, some air would be sucked into the treatment chamber with the result that a considerable amount of air would be intermixed with the material being treated and would pass out through the discharge pipe 26. According to the present invention the lower end of the pipe 31 is continuously submerged in the liquid body 32, and therefore it is effectively sealed against entrance of atmospheric air. Subatmospheric pressure existing within the treatment chamber causes an upflow of liquid through the pipe 31 into the treatment chamber. This upflow tends to occur in a pulsating or intermittent manner, rather than as a continuous even flow. Such flow does not interfere with proper separation of the solid phase impurities, nor in the downward movement of such impurities through the pipe 31 into the vessel 33. As the solid phase impurities discharge from the lower end of the pipe 31, they are swept along by the following stream of liquid, to be discharged through the pipe 36.

The liquid supplied to pipe 34 of the vessel 33 can be any liquid which when introduced into the treatment chamber, will not cause undesired contamination of the material passing to the settling tank. Although fresh water can be used for this purpose, we prefer to make use of the overflow from the settling tank or tanks used for the settling operation 13. By the use of this overflow it is not necessary to supply fresh water from a separate source and the mother liquor withdrawn through pipe 26 is not diluted.

It will be evident that the present process is a desirable improvement over the process disclosed in our copending application. All introduction and intermixing of atmospheric air into the material being treated in the chamber 14 is eliminated, and this facilitates the settling operation 13, and minimizes troublesome air in the slurry which is withdrawn for further treatment. We secure all of the features and advantages set forth in our copending application, including low cost production of a high purity magnesium hydroxide.

We claim:

1. In apparatus for the separation of solid phase impurities from a reaction mixture resulting from reaction of a lime containing precipitant with brine containing convertible magnesium salts, a treatment chamber symmetrical with respect to a vertical axis, the lower portion of said chamber being conical shaped, piping connected with the upper portion of said chamber for introducing a reaction mixture, additional piping connected with the upper portion of said chamber for removing mother liquor and precipitated magnesium hydroxide, impeller means within the upper portion of the chamber serving to impart rotary velocity to material therein, said impeller means serving to cause solid phase material to be separated out in the lower conical shaped portion of the chamber, a vessel disposed below said treatment chamber, means for maintaining a flowing body of liquid in said vessel, and a generally upright pipe serving to connect the lower portion of the treatment chamber with said vessel at a point below the level of liquid therein, said pipe having an effective length substantially less than a barometric pipe length corresponding to atmospheric pressure, a part of the liquid from said vessel being transferred upwardly through said last named pipe during operation of the apparatus, concurrently with downward movement of separated solid phase impurities through the pipe into the vessel.

2. In apparatus for the separation of solid phase impurities from a mixture resulting from the reaction of a lime containing precipitant with brine containing convertible magnesium salts, a treatment chamber having a substantially vertical axis and a lower conical shaped portion, means for introducing said reaction mixture into the upper portion of the chamber and to impart swirling motion to the material in the chamber about the vertical axis of the same, a pipe connected to the upper portion of the chamber and serving to remove material from the same, said swirling motion of material within the treatment chamber serving to effect centrifugal separation of solid phase impurities into the lower part of the chamber, a vessel disposed below said chamber, a generally upright pipe forming direct communication between the lower part of said chamber and said vessel, and means for maintaining a level of liquid in said vessel serving to submerge the lower end of said pipe, said pipe serving to convey solid phase impurities from said chamber to the vessel, said pipe having a length substantially less than a length corresponding to barometric pressure.

References Cited in the file of this patent

UNITED STATES PATENTS

| | | |
|---|---|---|
| 1,601,938 | Campbell | Oct. 5, 1926 |
| 1,932,531 | Parker | Oct. 31, 1933 |
| 2,089,339 | Chesny | Aug. 10, 1937 |
| 2,276,245 | Clarke | Mar. 10, 1942 |
| 2,460,987 | Kanhofer | Feb. 8, 1949 |
| 2,479,138 | Scoles | Aug. 16, 1949 |
| 2,493,051 | Woodward | Jan. 3, 1950 |
| 2,493,752 | De Maestri | Jan. 10, 1950 |
| 2,595,314 | Vettel et al. | May 6, 1952 |

FOREIGN PATENTS

| | | |
|---|---|---|
| 607,784 | Great Britain | Sept. 6, 1946 |
| 627,423 | Great Britain | Aug. 9, 1949 |

OTHER REFERENCES

Engineering and Mining Jour., February 1952, page 129.